United States Patent
Feuerle et al.

(10) Patent No.: US 9,897,750 B2
(45) Date of Patent: Feb. 20, 2018

(54) LED LIGHT FITTING HAVING A LIGHT-GUIDING PANEL

(71) Applicant: ZUMTOBEL LIGHTING GMBH, Dornbirn (AT)

(72) Inventors: Helmut Feuerle, Sulzberg (AT); Marcel Kilga, Goetzis (AT); Michael Spiegel, Dornbirn (AT)

(73) Assignee: ZUMTOBEL LIGHTING GMBH, Dornbirn (AT)

( * ) Notice: Subject to any disclaimer, the term of this patent is extended or adjusted under 35 U.S.C. 154(b) by 122 days.

(21) Appl. No.: 14/783,857

(22) PCT Filed: Apr. 16, 2014

(86) PCT No.: PCT/EP2014/057807
§ 371 (c)(1),
(2) Date: Oct. 10, 2015

(87) PCT Pub. No.: WO2014/173777
PCT Pub. Date: Oct. 30, 2014

(65) Prior Publication Data
US 2016/0070057 A1    Mar. 10, 2016

(30) Foreign Application Priority Data
Apr. 24, 2013 (DE) .................. 20 2013 101 770 U (51) Int. Cl.
*G02B 6/00* (2006.01)
*F21V 8/00* (2006.01)

(52) U.S. Cl.
CPC ......... *G02B 6/0091* (2013.01); *G02B 6/0073* (2013.01); *G02B 6/0025* (2013.01); *G02B 6/0055* (2013.01); *G02B 6/0068* (2013.01)

(58) Field of Classification Search
CPC .. G02B 6/0025; G02B 6/0055; G02B 6/0068; G02B 6/0073; G02B 6/0091
See application file for complete search history.

(56) References Cited

U.S. PATENT DOCUMENTS 7,481,566 B2 *  1/2009  Han ................... G02B 6/0025
                                                  362/342
8,033,708 B2 * 10/2011  Tsubaki ............. G02B 6/0068
                                                  362/600

(Continued)

FOREIGN PATENT DOCUMENTS

| CN | 102537884 | 7/2012 |
| EP | 2192430 | 6/2010 |
| JP | 2007227095 | 9/2007 |

OTHER PUBLICATIONS

International Search Report for PCT/EP2014/057807, English translation attached to original, Both completed by the European Patent Office on Jul. 11, 2014, All together 7 Pages.

*Primary Examiner* — Peggy Neils
(74) *Attorney, Agent, or Firm* — Brooks Kushman P.C.

(57) ABSTRACT

A light fitting has an LED light source for generating light, and a light-guiding panel, the LED light source being arranged in such a way that the light is coupled into the light-guiding panel. In addition, a support element for supporting the light-guiding panel and an LED light source carrier element are provided, the LED light source carrier element being mounted such that it is displaceable relative to the support element.

13 Claims, 5 Drawing Sheets

(56) References Cited

U.S. PATENT DOCUMENTS

| | | | |
|---|---|---|---|
| 8,690,412 B2* | 4/2014 | Franklin | G02B 6/0073 362/612 |
| 8,858,054 B2* | 10/2014 | Kim | F21S 8/061 362/249.03 |
| 2007/0091222 A1* | 4/2007 | Huo | G02B 6/0086 349/58 |
| 2008/0111951 A1 | 5/2008 | Chang et al. | |
| 2009/0237957 A1 | 9/2009 | Tsubaki | |
| 2010/0149836 A1 | 6/2010 | Hung et al. | |
| 2011/0069510 A1 | 3/2011 | Yamashita et al. | |
| 2012/0063163 A1 | 3/2012 | Lai | |
| 2012/0147626 A1 | 6/2012 | Huang | |
| 2012/0281151 A1 | 11/2012 | Abe | |
| 2013/0063681 A1* | 3/2013 | Zhou | G02B 6/0025 349/64 |
| 2013/0070156 A1 | 3/2013 | Yoo et al. | |
| 2013/0201421 A1* | 8/2013 | Yu | G02F 1/133308 349/58 |

* cited by examiner

LED LIGHT FITTING HAVING A LIGHT-GUIDING PANEL

CROSS-REFERENCE TO RELATED APPLICATION

This application is the U.S. national phase of PCT Application No. PCT/EP2014/057807 filed on Apr. 16, 2014, which claims priority to DE Patent Application No. 20 2013 101 770.1 filed on Apr. 24, 2013, the disclosures of which are incorporated in their entirety by reference herein.

The invention relates to a light fitting having an LED light source (LED: light-emitting diode) and a light-guiding panel.

In the case of such a light fitting, it is necessary for the LED light source to be positioned precisely relative to the light-guiding panel during assembly so that it is ensured that the light from the LED light source is coupled satisfactorily into the light guide duration operation of the light fitting. In order to achieve particularly effective coupling in or irradiation of the light, particularly precise positioning is necessary here. This involves a considerable amount of outlay in practice.

It is an object of the invention to specify a corresponding improved light fitting; in particular, the light fitting, while being highly efficient, should allow easier assembly.

This object is achieved according to the invention by the subject matter indicated in the independent claim. Particular embodiments of the invention are specified in the dependent claims.

The invention provides a light fitting which has an LED light source for generating light, and a light-guiding panel, wherein the LED light source is arranged such that the light is coupled into the light-guiding panel. The light fitting also has a bearing element for bearing the light-guiding panel, and an LED-light-source carrier element, wherein the LED-light-source carrier element is mounted for displacement relative to the bearing element.

This configuration advantageously achieves the situation where, for assembly of the light fitting, the light-guiding panel, in the first instance, can be moved into a certain reference plane with the aid of the bearing element and then straightforward displacement of the LED-light-source carrier element establishes the relative positioning between the LED light source and the light guide which is envisaged for operation of the light fitting. This renders assembly of the light fitting easier. The LED-light-source carrier element is preferably mounted for displacement relative to the bearing element such that it can be displaced from an installation position into an operating position, wherein the light-guiding panel can be separated reversibly from the rest of the light fitting when the LED-light-source carrier element is located in the installation position. This makes it possible for the light-guiding panel, during assembly of the light fitting, to be arranged particularly straightforwardly on the bearing element, as envisaged, when the LED-light-source carrier element is located in the installation position.

When the LED-light-source carrier element is located in the operating position, the light-guiding panel is preferably retained relative to the LED light source, by the LED-light-source carrier element, in a position envisaged for operation of the light fitting. This makes it possible to achieve the situation where the light-guiding panel is fixed particularly suitably in a secure position when the LED-light-source carrier element is located in the operating position.

The light fitting is preferably configured such that the LED-light-source carrier element, in the operating position, presses laterally against the light-guiding panel. This makes it possible to ensure that the suitable relative position between the light-guiding panel and the LED light source is reliably maintained during operation of the light fitting, in particular even in the case of corresponding fluctuations in temperature and the associated changes in size of the components of the light fitting, that is to say, for example, if the light-guiding panel and the bearing element expand to differently pronounced extents.

The LED-light-source carrier element, in the operating position, is preferably latched in position relative to the bearing element with the aid of a resilient element. This makes it possible to achieve even more secure fixing of the relative position during operation of the light fitting; moreover, it is thereby advantageously possible, during assembly of the light fitting, to sense haptically when the LED-light-source carrier element has reached the operating position at the end of the displacement.

The LED-light-source carrier element is preferably formed such that, in the operating position, it engages around the light-guiding panel to position the same. This allows the light-guiding panel to be secured in position, or retained securely, in a particularly reliable manner.

The LED-light-source carrier element preferably has a metal carrier plate. This results, in a particularly suitable manner, in the LED-light-source carrier element being capable of displacement relative to the bearing element.

Furthermore, the metal carrier plate is preferably of angled form here. This makes it possible to achieve, in a particularly suitable manner, the situation where changes in size of the light-guiding panel induced by fluctuations in temperature are absorbed, or compensated for, by the LED-light-source carrier element.

Furthermore, the metal carrier plate preferably consists of aluminum. This makes it possible to achieve the situation where the metal carrier plate has a particularly suitable level of flexibility. In addition, this advantageously makes it possible for heat which occurs during operation of the LED light source to be dissipated via the LED-light-source carrier element.

The LED-light-source carrier element preferably has a light-emitting diffuser, which acts to diffuse the light from the LED light source. This makes it possible to achieve the situation where the light from the LED light source is coupled particularly uniformly into the light-guiding panel, in particular if the LED light source has a plurality of LEDs.

The light-emitting diffuser here is preferably connected to the rest of the LED-light-source carrier element via a latching connection. This makes it easier for the LED-light-source carrier element to be assembled.

The light-emitting diffuser preferably butts against the light-guiding panel. This makes it possible to achieve the situation where the LED light source is arranged particularly suitably in a defined position, in particular at a defined distance from the light-guiding panel.

It is preferable for the LED light source to have a plurality of LEDs and for the light-emitting diffuser to have a plurality of holes, wherein each of the LEDs engages precisely in one of the holes. This makes it possible to achieve the situation where the light-emitting diffuser influences the light from the LED light source in a particularly effective and suitable manner.

A reflector is preferably arranged between the light-guiding panel and the bearing element. This makes it possible to achieve the situation where a particularly large amount of light is emitted from the light-guiding panel and the efficiency of the light fitting is thus increased.

The invention will be explained in more detail hereinbelow by way of an exemplary embodiment and with reference to the figures, in which.

Figure 1:
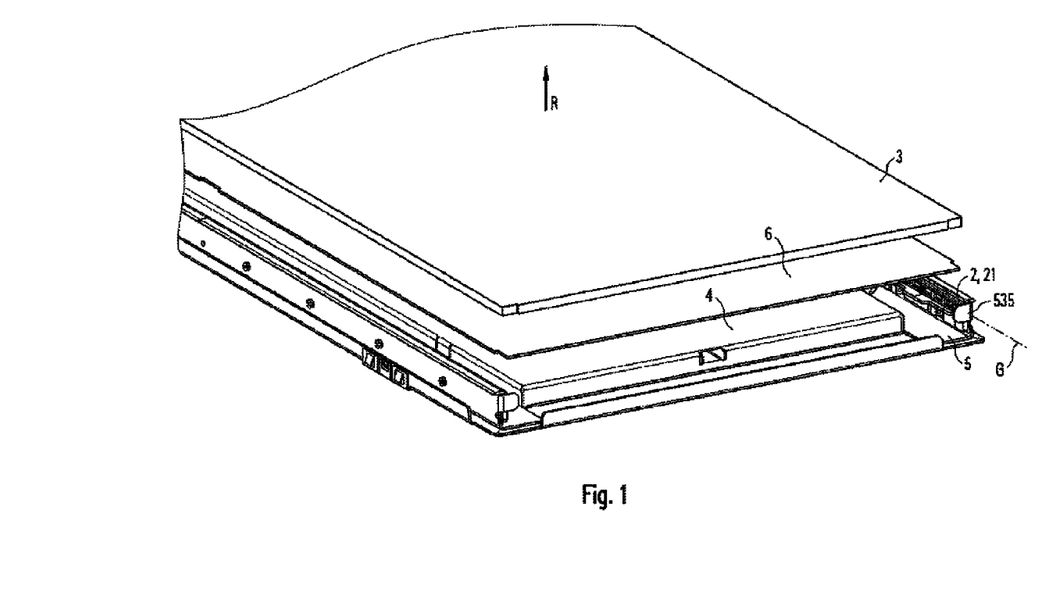
FIG. 1 shows a perspective sketch in a manner of an exploded illustration relating to a light fitting according to the invention.

FIG. 1 shows a perspective sketch relating to parts of a light fitting according to the invention. The light fitting has an LED light source 2 for generating light, and a light-guiding panel 3. On account of being in panel form, the light-guiding panel 3, on two opposite sides, has two large main surfaces, which are connected to one another via small or narrow peripheral surfaces, in other words end surfaces.

The sketch shown in FIG. 1 is illustrated in the manner of an exploded illustration. If the light fitting has been assembled as envisaged, the LED light source 2 is arranged such that the light generated by the LED light source 2 is coupled or irradiated into the light-guiding panel 3 via one of the peripheral surfaces of the light-guiding panel 3, also referred to hereinbelow as "a peripheral irradiation surface".

Thereafter, the light thus coupled into the light-guiding panel 3 is emitted via at least one of the two large main surfaces. The light is thus emitted "over a surface area" via the light-guiding panel 3. In the case of the embodiment sketched in FIG. 1, emission takes place via that main surface which is oriented in the direction R indicated by an arrow. In the present description, it is assumed that the light fitting is oriented such that the light-guiding panel 3 is positioned horizontally and the direction R is oriented vertically upward. This positioning, however, is not restrictive and is selected in this way merely for the present description. For example, the light fitting may be a ceiling light fitting which is provided for the light-guiding panel to emit light downward.

The light fitting also has a bearing element 4, which serves for bearing the light-guiding panel 3. It may be advantageous, for example in production terms, for the bearing element 4 to be a sheet-metal part. Overall—as can be gathered by way of example from FIG. 1—the bearing element 4 may be of essentially panel-like configuration, wherein the bearing element 4 is positioned parallel to the light-guiding panel 3.

The light fitting also has an LED-light-source carrier element 5. In FIG. 2, an end region of the LED-light-source carrier element 5, connected to the LED light source 2, is sketched in perspective, separately from the rest of the light fitting. The LED light source 2 may comprise a board, on which a plurality of LEDs 21 are arranged, in particular along a horizontal straight line G.

The LED-light-source carrier element 5 is mounted for displacement relative to the bearing element 4. The mounting may be configured advantageously, in production terms, in the form of a slide bearing. In the example shown, the LED-light-source carrier element 5 is connected in a correspondingly movable manner to the bearing element 4. The bearing element 4 here serves as a holder for the LED-light-source carrier element 5.

In particular, the LED-light-source carrier element 5 is mounted for displacement relative to the bearing element 4 such that it can be displaced from an installation position into an operating position, wherein the light-guiding panel 3 can be separated reversibly from the rest of the light fitting when the LED-light-source carrier element 5 is located in the installation position.

Figure 2A:
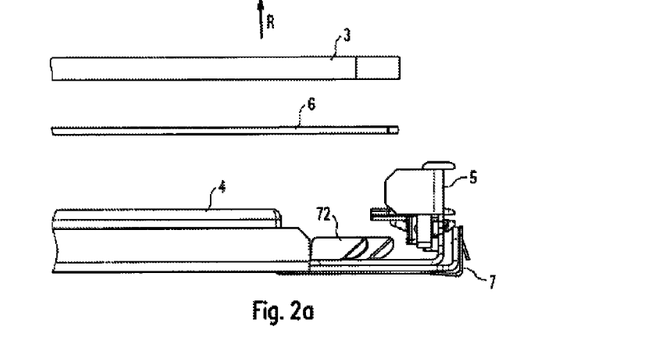
FIGS. 2a to 2c show three sketches relating to the operation of assembling the light fitting.
Figure 2B:
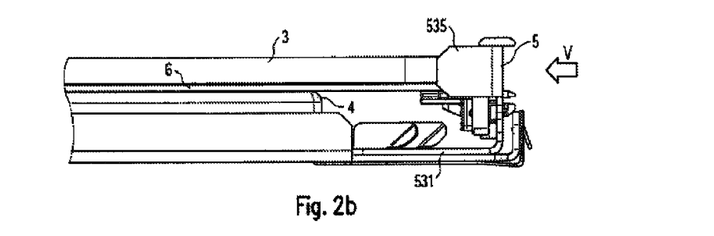
Figure 2C:
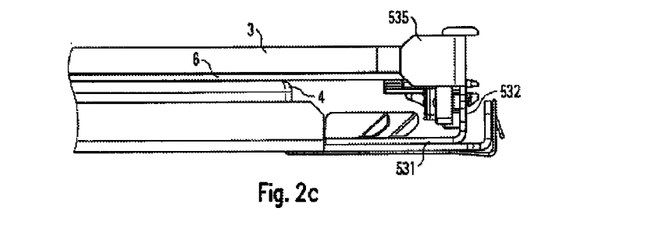

FIGS. 2a, 2b and 2c show three cross-sectional sketches relating to these two positions of the LED-light-source carrier element 5. In the situations which are sketched in FIGS. 2a and 2b, the LED-light-source carrier element 5 is located in the installation position. When the LED-light-source carrier element 5 is located in this installation position, the light-guiding panel 3 can be removed without obstruction in direction R or upward or, conversely, can be moved without obstruction from above, counter to direction R, that is to say downward or in the direction of the bearing element 4, until it is located in that position in relation to the bearing element 4 which is envisaged for operation. For assembly of the light fitting, it is therefore advantageously possible for the LED-light-source carrier element 5 to be arranged in the installation position and then for the light-guiding panel 3 to be moved downward from above counter to direction R.

In the situation sketched in FIG. 2c, the LED-light-source carrier element 5 is located in the operating position. In this situation, the light-guiding panel 3 is retained or fixed relative to the LED light source 2, by the LED-light-source carrier element 5, in a position envisaged for operation of the light fitting.

The LED-light-source carrier element 5 is preferably mounted for displacement such that, by virtue of displacement from the installation position into the operating position, the LED light source 2, or the row of LEDs 21, is moved in the direction of the peripheral irradiation surface of the light-guiding panel 3.

In the example shown, the mounting, accordingly, is such that, during displacement, the LED light source 2 moves horizontally and at right angles to the straight line G. FIG. 2b indicates this displacement direction V using a thick arrow.

Figure 4:
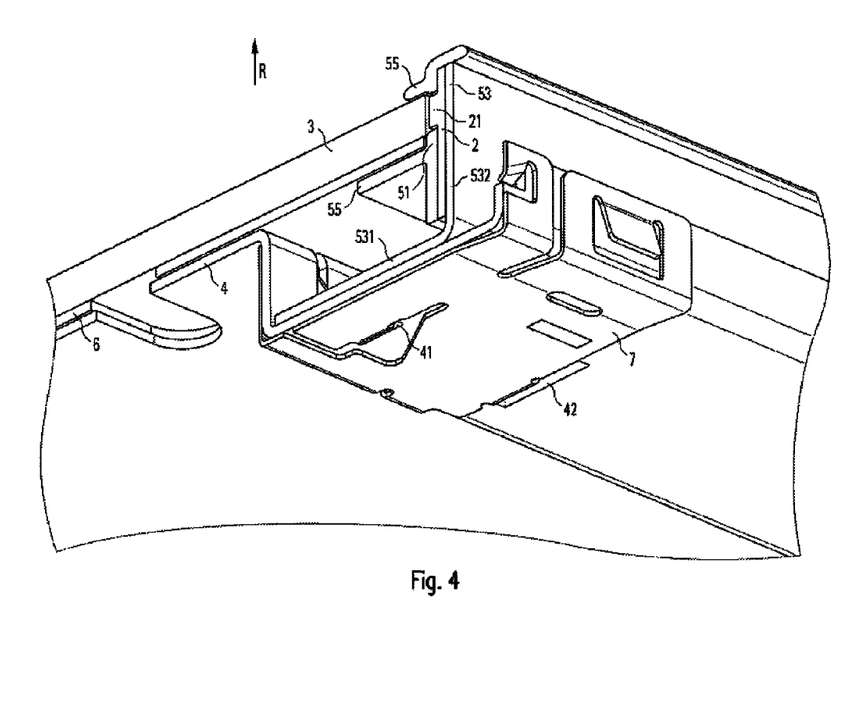
FIG. 4 shows a perspective sketch, in detail form, in the manner of a cross-sectional illustration.

FIG. 4 shows a perspective sectional illustration representing a situation in which the LED-light-source carrier element 5 is located in the operating position. In this situation, the LEDs 21 are located preferably in very close proximity to the light-guiding panel 3, or the peripheral irradiation surface thereof, and this makes it possible for the light to be coupled in particularly efficiently.

The LED-light-source carrier element 5 is preferably formed such that, in the operating position, it engages around the light-guiding panel 3 to position the same. For example it is possible for the LED-light-source carrier element 5 to have, for this purpose, protrusions or arms 55 which serve for fixing the position of the light-guiding panel 3 and, in particular, engage around the light-guiding panel 3 from above and beneath. This allows particularly reliable and secure positioning of the light-guiding panel 3.

The light fitting is preferably configured such that the LED-light-source carrier element 5, in the operating position, presses laterally against the light-guiding panel 3. This allows not just a particularly reliable retaining action; rather, it is also possible to achieve the situation when changes in size of the parts involved, that is to say, in particular, of the light-guiding panel 3 and the bearing element 4, which are induced by fluctuations in temperature can be absorbed, or compensated for.

As is the case in the exemplary embodiment shown, the LED-light-source carrier element 5 preferably has a metal carrier plate 53. A mechanically particularly advantageous embodiment is made possible here if the metal carrier plate 53 is of angled configuration, in particular if angled about an edge extending parallel to the straight line G. A horizontal limb 531 of the metal carrier plate 53 and a vertical limb 532 of the metal carrier plate 53 are formed in this way. This makes it possible, particularly advantageously, for the LED light source 2 to be pressed resiliently against the light-guiding panel 3.

The metal carrier plate 53 particularly advantageously consists of aluminum. This is not just advantageous in respect of the aforementioned pressing action; it also allows a particularly suitable dissipation of heat which can occur during operation of the LED light source 2.

Figure 5A:
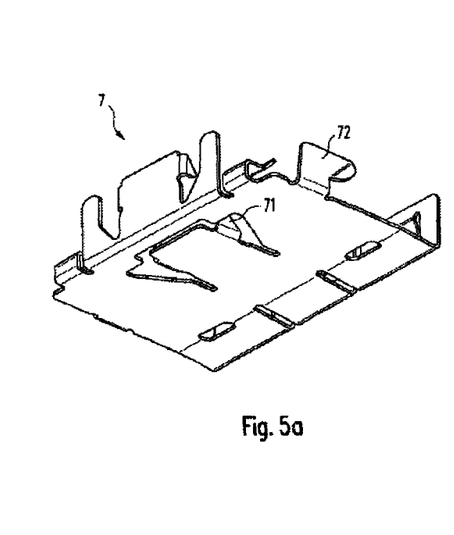
FIGS. 5a and 5b show two perspective sketches of the resilient element, by way of which the LED-light-source carrier element is positioned relative to the bearing element during assembly of the light fitting.
Figure 5B:
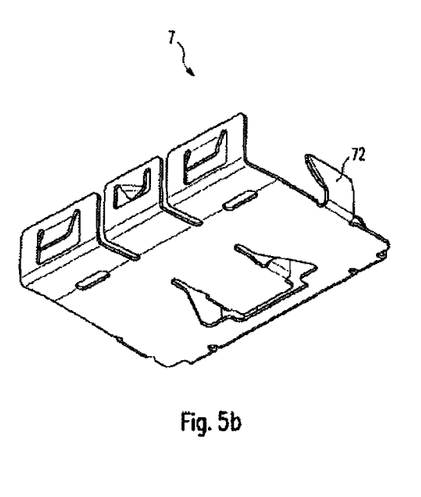

The LED-light-source carrier element 5, in the operating position, is preferably latched in position relative to the bearing element 4 with the aid of a resilient element 7. FIGS. 5a and 5b show two perspective views from different directions of the separated-off resilient element 7. In the case of the exemplary embodiment, for assembly purposes, the resilient element 7 is plugged onto the bearing element 4 from beneath, in which case it engages, by way of a resilient extension 71, through a through-hole 41—indicated in FIG. 4—in the bearing element 4 and engages in an aperture 57—indicated in FIG. 3—of the LED-light-source carrier element 5 when the LED-light-source carrier element 5 is located in the operating position. The aperture 57 is preferably formed in the horizontal limb 531 of the metal carrier plate 53.

Figure 3:
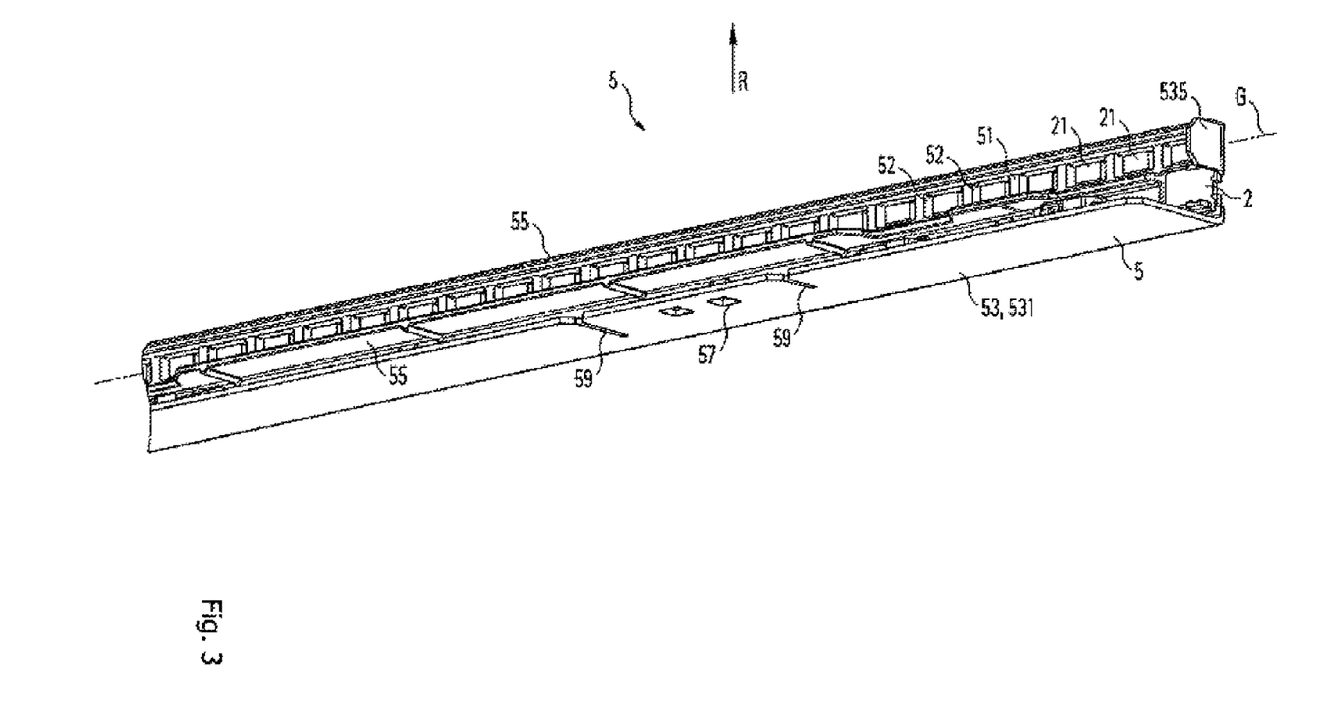
FIG. 3 shows a perspective sketch of an end region of the LED-light-source carrier element.

The resilient element 7 preferably also has guide arms 72, which serve for guiding purposes during the displacement movement of the LED-light-source carrier element 5 from the installation position into the operating position. As can be gathered by way of example from FIG. 4, the bearing element 4, for this purpose, preferably has corresponding, further through-holes 42. It is possible here for the carrier element 53—as shown in FIG. 3—to have slots 59, in which the guide arms 72 of the resilient element 7 correspondingly engage. These slots 59 are preferably also formed on the horizontal limb 531 of the metal carrier plate 53.

It is preferably also the case that the metal carrier plate 53 has at the two end regions—as seen in relation to the straight line G—stops 535, which serve to secure the light-guiding panel 3 in position to even better effect. The stops 535 may be formed, for example, by angled regions of the vertical limb 532 of the metal carrier plate 53.

As is also the case in the exemplary embodiment, the LED-light-source carrier element 5 preferably has a light-emitting diffuser 51, which is indicated in FIGS. 3 and 4 and is configured such that it acts to diffuse the light from the LED light source 2. This achieves the situation where the light from the LEDs 21 is irradiated or coupled into the peripheral irradiation surface of the light-guiding panel 3 more uniformly, rather than in point form. This then makes it possible to achieve particularly homogeneous light emission.

The light-emitting diffuser 51 is preferably connected to the rest of the LED-light-source carrier element 5, in particular to the metal carrier plate 53, via a latching connection. This allows the LED-light-source carrier element 5 to be assembled in a particularly straightforward manner. The LED light source 2 is particularly preferably retained on the rest of the LED-light-source carrier element 5, in particular on the metal carrier plate 53, by the light-emitter diffuser 51.

As shown in the exemplary embodiment, the light-emitting diffuser 51 preferably has a plurality of holes 52, wherein each of the LEDs 21 engages precisely in one of the holes 52. This configuration makes it possible, on the one hand, for the LEDs 21 to be protected to particularly good effect, and, on the other hand, for the LEDs 21 to be positioned particularly precisely relative to the light-guiding panel 3.

As is the case in the exemplary embodiment, and can be gathered for example from FIG. 4, the LED light source 2 is retained preferably between the metal carrier plate 52, on the one hand, and the light-emitting diffuser 53, on the other hand. The LEDs 21 here are arranged on one side of the board of the LED light source 2 and the light-emitting diffuser 51 butts against said board, to be precise on that side on which the LEDs 21 are located. The light-emitting diffuser 51 here, as already mentioned above, engages around the LEDs 21 by way of its holes 52. For example, the light-emitting diffuser 51 may have stubs which engage through openings in the board and, on the opposite side, form the aforementioned latching connection to the carrier element 53.

The light-emitting diffuser 51 makes it possible to achieve the situation where, in particular, the LEDs 21 are protected to particularly good effect during assembly of the light fitting.

For example, the light-emitting diffuser 51 consists of polycarbonate (PC).

The light fitting is preferably configured such that the light-emitting diffuser 51 butts against the light-guiding panel 3, or the peripheral irradiation surface thereof, when the LED-light-source carrier element 5 is located in the operating position. This makes it possible to achieve the situation where a suitable relative position, in particular a defined distance, between the light-guiding panel 3 and the LED light source 2 is maintained particularly reliably during operation of the light fitting.

As is the case in the exemplary embodiment, provision may be made for the light fitting also to have a reflector 6; this makes it possible to increase the efficiency of the emission of light from the light fitting. The reflector 6 is preferably in panel form and is arranged parallel to the light-guiding panel 3, to be precise between the light-guiding panel 3 and the bearing element 4. In the case of the example shown, the LED-light-source carrier element 5 engages laterally, by way of the arms 55, around both the light-guiding panel 3 and the reflector 6. Moreover, the stops 535 of the carrier element 53 are configured such that they also act correspondingly to secure the position of the reflector 6.

For assembly of the light fitting, the following steps may be provided: first of all the LED light source 2 is installed, with the light-emitting diffuser 51, on the metal carrier plate 53. This forms an "LED unit". In a further step, the LED unit is connected to the bearing element 4 by means of the resilient element 7, to be precise such that the LED-light-source carrier element 5 is, that is to say the light-emitting diffuser 51 and the metal carrier plate 53 are, located in the installation position. In a further step, the light-guiding panel 3, possibly together with the reflector 6, is positioned on the bearing element 4. The LED unit or the LED-light-source carrier element 5 is then displaced into the operating position, that is to say is displaced to the extent where the resilient extension 71 of the resilient element 7 engages in the aperture 57 of the LED-light-source carrier element 5. As a result, the guiding panel 3 is fixed in relation to the LED light source 2 in the relative position envisaged for operation of the light fitting.

In the operating position, the light-guiding panel 3 is subjected to a small amount of contact pressure via the metal carrier plate 53, by way of prestressing, as a result of which the light from the LED light source 2 is coupled into the light-guiding panel 3 to particularly good effect.

The LED light source 5 is protected by the light-emitting diffuser 51 during assembly, and the "LED points" are resolved by the light-emitting diffuser 51 during operation.

The arrangement according to the invention makes it possible to achieve the situation where the light-guiding panel 3 and possibly the reflector 6 can be fastened straightforwardly and the LED light source 2 can be positioned in a particularly suitable and reliable manner relative to the light-guiding panel 3.

FIG. 1 shows an embodiment in which the light fitting also has a further LED unit, which is configured in a manner analogous to the first-mentioned LED unit, the configuration being such that the further LED unit irradiates its light into the light-guiding panel 3 via a further peripheral irradiation surface of the latter, said further surface being located opposite the first-mentioned peripheral irradiation surface. This makes it possible for light to be coupled particularly homogeneously into the light-guiding panel 3.

The invention claimed is:

1. A light fitting comprising:
   an LED light source for generating light,
   a light-guiding panel, wherein the LED light source is arranged such that the light is coupled into a peripheral irradiation surface of the light-guiding panel,
   a bearing element for bearing the light-guiding panel, and
   an LED-light-source carrier element mounting the LED-light-source for displacement relative to the bearing element,
   wherein the LED-light-source carrier element can be displaced from an installation position into an operating position in the direction of the peripheral irradiation surface of the light guiding-panel, and the light-guiding panel can be separated reversibly from the rest of the light fitting when the LED-light-source carrier element is located in the installation position.

2. The light fitting as claimed in claim 1, in which, when the LED-light-source carrier element is located in the operating position, the light-guiding panel is retained relative to the LED light source, by the LED-light-source carrier element, in a position envisaged for operation of the light fitting.

3. The light fitting as claimed in claim 1, which is configured such that the LED-light-source carrier element, in the operating position, presses laterally against the light-guiding panel.

4. The light fitting as claimed in claim 1, in which the LED-light-source carrier element, in the operating position, is latched in position relative to the bearing element with the aid of a resilient element.

5. The light fitting as claimed in claim 1, in which the LED-light-source carrier element is formed such that, in the operating position, it engages around the light-guiding panel to position the same.

6. The light fitting as claimed in claim 1, in which the LED-light-source carrier element has a metal carrier plate.

7. The light fitting as claimed in claim 6, in which the metal carrier plate is of angled form.

8. The light fitting as claimed in claim 6, in which the metal carrier plate consists of aluminum.

9. The light fitting as claimed in claim 1, in which the LED-light-source carrier element has a light-emitting diffuser, which acts to diffuse the light from the LED light source.

10. The light fitting as claimed in claim 9, in which the light-emitting diffuser is connected to the rest of the LED-light-source carrier element via a latching connection.

11. The light fitting as claimed in claim 9, in which the light-emitting diffuser butts against the light-guiding panel.

12. The light fitting as claimed in claim 9, in which the LED light source has a plurality of LEDs and the light-emitting diffuser has a plurality of holes, wherein each of the LEDs engages precisely in one of the holes.

13. The light fitting as claimed in claim 1, in which a reflector is arranged between the light-guiding panel and the bearing element.

* * * * *